UNITED STATES PATENT OFFICE.

SANTIAGO RUBERT AND PIO RUBERT LAPORTA, OF BARCELONA, SPAIN.

PREVENTING INCRUSTATION.

No. 831,107.             Specification of Letters Patent.         Patented Sept. 18, 1906.

Application filed March 12, 1906. Serial No. 305,506.

*To all whom it may concern:*

Be it known that we, SANTIAGO RUBERT and PIO RUBERT LAPORTA, subjects of the King of Spain, residing at Barcelona, Spain, have invented a certain new and useful Composition of Matter for Removing and Preventing Incrustation in Water-Receptacles, of which the following is a specification.

This invention relates to a composition of matter for removing and preventing incrustation in water-receptacles.

It is a well-known fact that incrustation is produced in water-tanks, tubes, and the like, and more particularly on the inner surfaces of steam-generators, mainly owing to the presence of calcareous and magnesian salts in the water introduced into the said tanks, tubes, or generators. It is also known that such incrustation has great disadvantages and frequently constitutes an element of danger in the working of the apparatus in which it occurs.

The object of the present invention is to provide a preparation for admixture with water used for various industrial purposes, the said preparation being not only adapted to remove existing incrustation, but also to prevent the formation of such incrustation by precipitating the calcareous or magnesian salts contained in the water in solution or in suspension. This preparation, which can be added to the water before or during use, consists of acid sulfates, neutral phosphates, and oxids of potassium and sodium, mixed in proportions which vary according to requirements and to the nature of the water used. A neutral coloring substance can, if desired, be added to the preparation, and the latter can be used in a liquid, solid, pasty, granular, or pulverized state. If it is desired to use the mixture in a liquid state, the constituents thereof are dissolved in water, whereas if the preparation is to be used in a solid state the constituents are preferably first formed into a paste with the aid of a suitable quantity of water, the said paste being then, if desired, strongly compressed and molded or cut into cakes of suitable size. The paste can, if desired, be introduced into jars or other storage-receptacles before it dries, or it can be dried and pulverized or reduced to a granular state. The preparation can also be produced by intimately mixing suitable proportions of the constituents while dry.

What we claim as our invention, and desire to secure by Letters Patent of the United States, is—

1. A composition of matter for the purpose set forth consisting of a mixture of acid sulfates, neutral phosphates and oxids of potassium and sodium.

2. A composition of matter for the purpose set forth consisting of a mixture of acid sulfates, neutral phosphates and oxids of potassium and sodium with the addition of a neutral coloring substance.

In witness whereof we have signed this specification in the presence of two witnesses.

SANTIAGO RUBERT.
    PIO RUBERT LAPORTA.

Witnesses:
    L'BONETY SURÁN,
    STANLEY A. HARRIS.